United States Patent
Eom et al.

(10) Patent No.: US 11,053,824 B2
(45) Date of Patent: Jul. 6, 2021

(54) EXHAUST GAS PURIFICATION APPARATUS AND EXHAUST GAS PURIFICATION METHOD USING SAME

(71) Applicant: Korea Electric Power Corporation, Naju-si (KR)

(72) Inventors: Yong Seok Eom, Daejeon (KR); Jung Bin Lee, Daejeon (KR); Jun Han Kim, Daejeon (KR); Joong Won Lee, Daejeon (KR); Kwang Beom Hur, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 101 days.

(21) Appl. No.: 16/079,051

(22) PCT Filed: Nov. 29, 2016

(86) PCT No.: PCT/KR2016/013831
§ 371 (c)(1),
(2) Date: Aug. 22, 2018

(87) PCT Pub. No.: WO2018/056517
PCT Pub. Date: Mar. 29, 2018

(65) Prior Publication Data
US 2020/0355103 A1    Nov. 12, 2020

(30) Foreign Application Priority Data

Sep. 23, 2016    (KR) ........................ 10-2016-0122396

(51) Int. Cl.
*F01N 3/035*    (2006.01)
*F01N 3/10*    (2006.01)
(Continued)

(52) U.S. Cl.
CPC .......... *F01N 3/035* (2013.01); *F01N 3/2066* (2013.01); *B01D 53/9418* (2013.01);
(Continued)

(58) Field of Classification Search
CPC .. F01N 9/002; F01N 2570/14; F01N 2610/02; F01N 3/035; F01N 3/2066; F01N 3/106; B01D 53/9418; B01D 2255/1021
(Continued)

(56) References Cited

U.S. PATENT DOCUMENTS 4,257,225 A * 3/1981 Crone, Jr. ............... F01N 3/023
60/296
4,975,256 A * 12/1990 Hegedus ............ B01D 53/8628
423/239.1
(Continued)

FOREIGN PATENT DOCUMENTS

CN    104519998 A    4/2015
DE    102014200092 A1 *    7/2014 ............ F01N 3/106
(Continued)

OTHER PUBLICATIONS

An English Machine Translation to Kim Hee Bum (Pub. Number KR 10-1575478 B1), published on Dec. 7, 2015.*
China Office Action.

*Primary Examiner* — Thai Ba Trieu
(74) *Attorney, Agent, or Firm* — Foundation Law Group, LLP

(57) ABSTRACT

The present invention relates to an exhaust gas purification apparatus and an exhaust gas purification method using the same. According to a specific embodiment, the exhaust gas purification apparatus comprises: a diesel oxidation catalyst (DOC) unit for converting nitrogen oxides ($NO_x$), contained in an exhaust gas introduced therein through a gas inlet portion, into nitrogen dioxide ($NO_2$); a composite diesel particulate filter (DPF) unit connected to the rear end of the
(Continued)

DOC unit through an inflow line and removing harmful components including particulate substances and nitrogen oxides from the exhaust gas discharged from the DOC unit and introduced therein; and a circulation line disposed in the inflow line so as to introduce the exhaust gas discharged from the DOC unit into the gas inlet portion.

9 Claims, 3 Drawing Sheets

(51) Int. Cl.
    *F01N 9/00*         (2006.01)
    *B01D 53/94*      (2006.01)
    *F01N 3/20*        (2006.01)

(52) U.S. Cl.
    CPC ...... *B01D 2255/1021* (2013.01); *F01N 3/106* (2013.01); *F01N 9/002* (2013.01); *F01N 2570/14* (2013.01); *F01N 2610/02* (2013.01)

(58) Field of Classification Search
    USPC ............................................................ 60/295
    See application file for complete search history.

(56) References Cited

U.S. PATENT DOCUMENTS

| | | | | |
|---|---|---|---|---|
| 7,797,931 B2* | 9/2010 | Dubkov | ................ | B01J 37/038 60/299 |
| 7,805,931 B2* | 10/2010 | Carlill | ................... | F01N 13/009 60/295 |
| 8,551,910 B2* | 10/2013 | Raffy | .................... | C04B 35/478 502/439 |
| 9,169,753 B2* | 10/2015 | Twigg | .................... | F01N 3/035 |
| 2004/0226288 A1* | 11/2004 | Okugawa | ................ | F01N 3/035 60/295 |
| 2005/0160663 A1* | 7/2005 | Valentine | ................ | F01N 3/106 44/388 |
| 2005/0198945 A1* | 9/2005 | Okugawa | .............. | F02D 41/029 60/295 |
| 2009/0241653 A1* | 10/2009 | Wang | ................... | G01M 15/102 73/114.71 |
| 2010/0024390 A1* | 2/2010 | Wills | ....................... | F01N 3/208 60/287 |
| 2010/0024393 A1* | 2/2010 | Chi | ......................... | F01N 3/106 60/286 |
| 2010/0247411 A1* | 9/2010 | Larcher | .................... | B01J 37/03 423/239.1 |
| 2010/0303677 A1* | 12/2010 | Henry | ..................... | F01N 3/035 422/171 |
| 2010/0326055 A1* | 12/2010 | Huber | .................... | F01N 3/035 60/286 |
| 2011/0000190 A1* | 1/2011 | Svensson | ................ | F01N 3/035 60/295 |
| 2016/0038878 A1* | 2/2016 | Sonntag | ................ | F01N 3/035 60/301 |
| 2016/0193597 A1* | 7/2016 | Wolff | ....................... | B01J 29/46 502/65 |
| 2018/0280876 A1* | 10/2018 | Chen | ....................... | F01N 3/208 |
| 2018/0280877 A1* | 10/2018 | Chen | ....................... | F01N 3/208 |

FOREIGN PATENT DOCUMENTS

| | | | | | |
|---|---|---|---|---|---|
| GB | 2566350 | A | * | 3/2019 | ............ F01N 3/023 |
| JP | 2003049637 | A | * | 2/2003 | |
| JP | 2006257920 | A | | 9/2006 | |
| JP | 2014517892 | A | | 7/2014 | |
| KR | 20050051637 | A | | 6/2005 | |
| KR | 20090075694 | A | | 7/2009 | |
| KR | 102010016477 | A | | 10/2010 | |
| KR | 101575478 | B | | 12/2015 | |
| KR | 20160032504 | A | | 3/2016 | |
| KR | 1020160051359 | A | | 11/2016 | |
| WO | WO-2009077126 | A1 | * | 6/2009 | ............ F01N 3/035 |

* cited by examiner

[Fig 1]
100 (Prior Art)
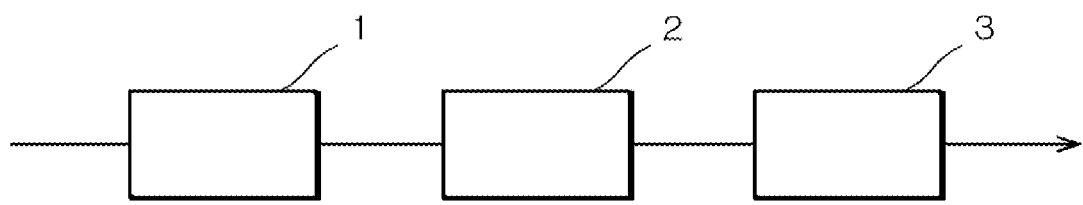

[Fig 2]
200
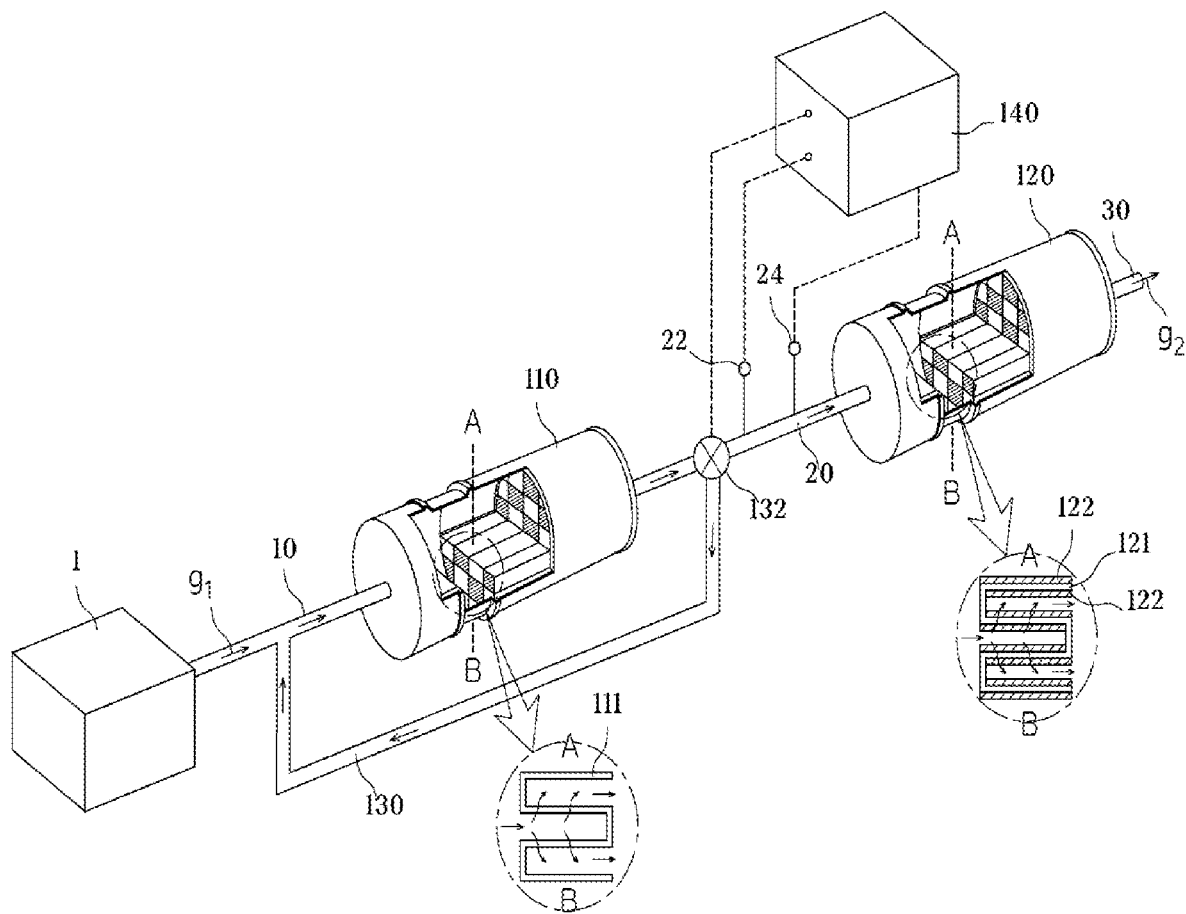

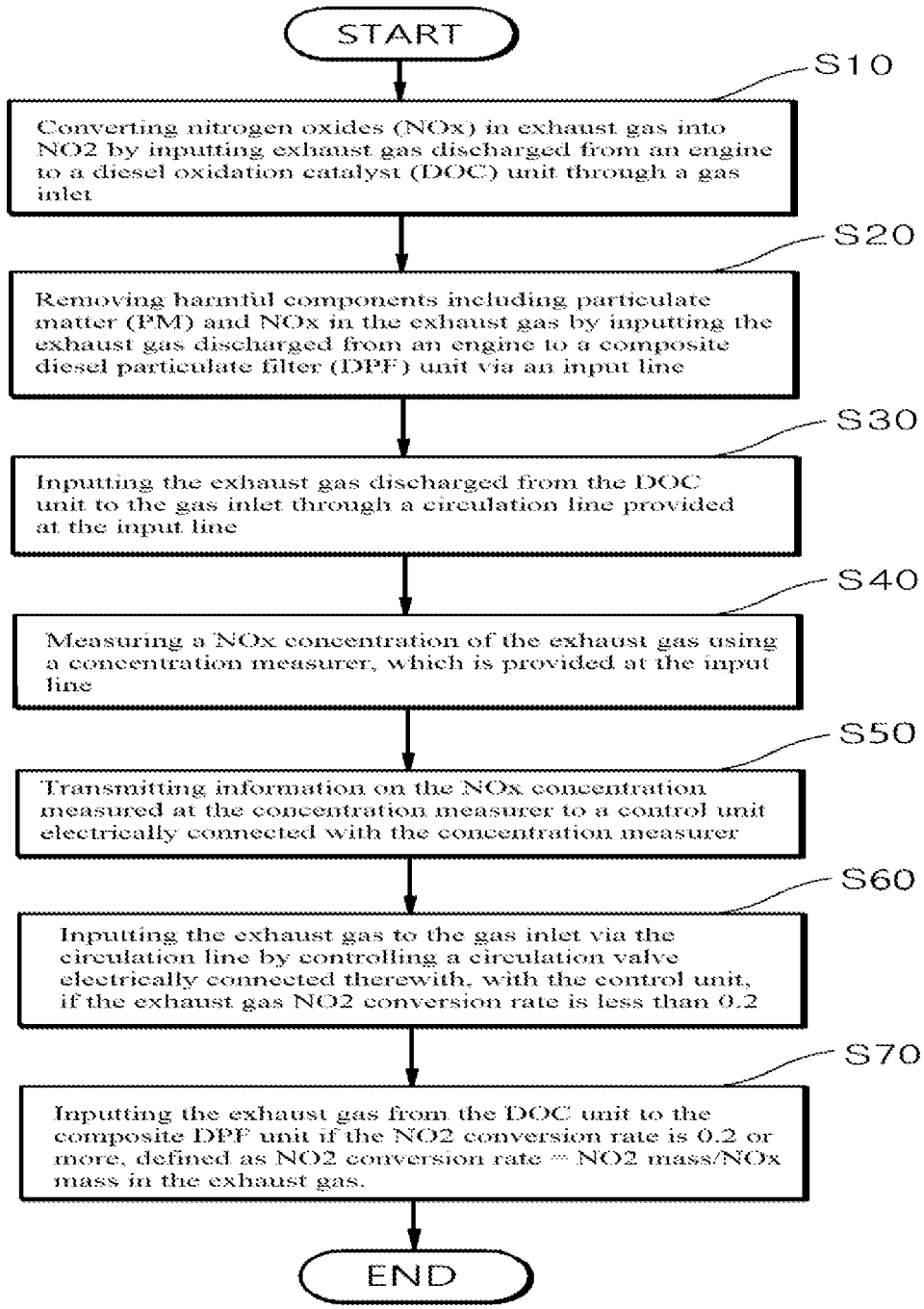

EXHAUST GAS PURIFICATION APPARATUS AND EXHAUST GAS PURIFICATION METHOD USING SAME

CROSS-REFERENCE TO RELATED APPLICANTS

This is application is a 371 national phase application of PCT/KR2016/013831, filed on Nov. 29, 2016, which claims priority of Korean Application No. KR 10-2016-0122396, filed on Sep. 23, 2016. The contents are incorporated herein by reference herein.

TECHNICAL FIELD

The present invention relates to an exhaust gas purification apparatus and a method for purifying exhaust gas using the same.

BACKGROUND ART

Diesel exhaust gas discharged from a diesel engine contains hydrocarbons, nitrogen oxides (NOx) and particulate matter (PM). As an apparatus for treating such diesel exhaust gas, an apparatus consisting of a diesel particulate filter (DPF) involved in active regeneration of PM stacked on a filter using an external heat source (a burner, an electric heater, etc.) after capturing PM in the diesel exhaust gas using the filter, and selective catalytic reduction (SCR) which causes a reaction between a reducing agent (urea) and NOx over a catalyst to remove NOx at the rear of the DPF has been developed.

FIG. 1 illustrates a conventional exhaust gas purification apparatus. Referring to FIG. 1, an exhaust gas purification apparatus 100 sequentially includes a diesel oxidation catalyst unit 1, a DPF unit 2 and an SCR unit 3. The diesel oxidation catalyst (DOC) is included upstream of the DPF to remove PM by oxidation by removing hydrocarbons and converting nitric oxide (NO) among NOx into nitrogen dioxide ($NO_2$). A method for performing passive regeneration of PM in the DPF without an external heat source has also been developed. In this case, to convert NO into nitrogen dioxide ($NO_2$), expensive precious metal catalysts such as platinum (Pt) and palladium (Pd) are generally used, and to improve a conversion rate, a large amount of the precious metal catalysts has to be used. In addition, in order to smoothly oxidize PM, since a $NO_2$ proportion among total NOx has to be increased, it is necessary to include a means for reducing an amount of a precious metal catalyst used and for increasing a $NO_2$ conversion rate.

In addition, among catalysts in the SCR installed a rear of the DPF, a metal oxide-based catalyst and a $V_2O_5$—$WO_3$/$TiO_2$-based catalyst have low NOx removal activity and very low hydrothermal stability at 500° C. or higher, and therefore, in active regeneration in the DPF, the catalysts are irreversibly damaged over time. Particularly, a system consisting of DOC-DPF-SCR unit processes has a complicated process and a high back pressure, resulting in a decrease in engine efficiency, and therefore it is difficult to perform operational control and to stably operate the entire system.

The prior art relating to the present invention is disclosed in Korean Unexamined Patent Application Publication No. 2016-0032504 (published on Mar. 24, 2016, Title of the Invention: Apparatus for treating exhaust gas discharged from marine diesel engine).

Disclosure

Technical Problem

An object of the present invention is to provide an exhaust gas purification apparatus having excellent energy efficiency and economic feasibility during operation thereof.

Another object of the present invention is to provide an exhaust gas purification apparatus having excellent efficiency in processing a pollutant contained in diesel exhaust gas.

Still another object of the present invention is to provide an exhaust gas purification apparatus which enables passive regeneration of a composite DPF.

Yet another object of the present invention is to provide an exhaust gas purification apparatus which is able to reduce an amount of catalysts used in a diesel gas purifier.

Yet another object of the present invention is to provide an exhaust gas purification apparatus which enables compactness and a smaller size.

Yet another object of the present invention is to provide a method for purifying exhaust gas using the exhaust gas purification apparatus.

Technical Solution

One aspect of the present invention relates to an exhaust gas purification apparatus. In one exemplary embodiment, the exhaust gas purification apparatus includes a DOC unit which is configured to convert NOx contained in exhaust gas input through a gas inlet into $NO_2$; a composite DPF unit which is connected to a rear end of the DOC unit via an input line, and removes harmful components including PM and NOx due to input of exhaust gas discharged from the DOC unit; and a circulation line which is provided at the input line and configured to input the exhaust gas discharged from the DOC unit to a gas inlet.

In one exemplary embodiment, the composite DPF unit may include one or more supports among silicon carbide (SiC), cordierite ($2MgO.2Al_2O_3.5SiO_2$), aluminum titanate ($Al_2TiO_5$) and needle-like mullite ($Al_2SiO_5$).

In one exemplary embodiment, the composite DPF unit may further include a selective catalytic reduction (SCR) layer.

In one exemplary embodiment, the SCR layer may be prepared by supporting an active ingredient and a promoter in a support containing a titanium dioxide-zirconia compound, the active ingredient may include a rare earth element-vanadate compound, and the promoter may include a transition metal oxide.

In one exemplary embodiment, the support may contain the titanium dioxide and zirconia at a molar ratio of about 1:0.8 to about 1:1.5.

In one exemplary embodiment, with respect to the total weight of the SCR layer, about 80 wt % to about 90 wt % of a support, about 1 wt % to about 13 wt % of an active ingredient and about 1 wt % to about 15 wt % of a promoter may be included.

In one exemplary embodiment, the composite DPF unit may not include a heat source, and may remove a harmful component by $NO_2$ in the input exhaust gas.

In one exemplary embodiment, the exhaust gas input into the composite DPF unit may have a $NO_2$ conversion rate of about 0.2 or more, defined by Equation 1 below:

$$NO_2 \text{ conversion rate} = NO_2 \text{ mass/NOx mass in exhaust gas} \quad \text{[Equation 1]}$$

In one exemplary embodiment, at the input line, a concentration measuring unit configured to measure a NOx concentration of the exhaust gas in the input line may be further provided, and information on the NOx concentration measured at the concentration measuring unit may be transmitted to a control unit electrically connected with the concentration measuring unit, and when the exhaust gas $NO_2$ conversion rate deduced using the measured NOx concentration is less than about 0.2, the control unit may be provided at the circulation line, and configured to control a circulation valve electrically connected therewith such that the exhaust gas is input to the gas inlet.

In one exemplary embodiment, in the DOC unit, about 3 $g/ft^3$ to about 7 $g/ft^3$ of platinum may be supported on a porous alumina support.

Another aspect of the present invention relates to a method for purifying exhaust gas using the exhaust gas purification apparatus. In one exemplary embodiment, the method for purifying exhaust gas includes: converting NOx in exhaust gas into $NO_2$ by inputting exhaust gas to a DOC unit through a gas inlet; and removing harmful components including PM and NOx in the exhaust gas by inputting the exhaust gas to a composite DPF unit via an input line, wherein the exhaust gas discharged from the DOC unit is input to the gas inlet through a circulation line provided at the input line.

In one exemplary embodiment, the composite DPF unit may not include a heat source, and may be configured to remove a harmful component by the input exhaust gas.

In one exemplary embodiment, the exhaust gas input to the composite DPF unit may have a $NO_2$ conversion rate of about 0.2 or more, defined by Equation 1 below:

$NO_2$ conversion rate=$NO_2$ mass/NOx mass in exhaust gas [Equation 1]

In one exemplary embodiment, at the input line, a concentration measuring unit configured to measure a NOx concentration in the exhaust gas is further provided, and information on the NOx concentration measured at the concentration measuring unit may be transmitted to a control unit electrically connected with the concentration measuring unit. When the exhaust gas $NO_2$ conversion rate deduced using the measured NOx concentration is less than about 0.2, the control unit may be provided at the circulation line, and configured to control a circulation valve electrically connected therewith such that the exhaust gas is input to the gas inlet.

Advantageous Effects

Due to integration of a DPF unit and an SCR unit and exclusion of a heat source such as a heater essentially included in a conventional DPF unit, an exhaust gas purification apparatus of the present invention removes a harmful component including PM by passive regeneration occurring due to exhaust gas containing a high concentration of $NO_2$, without regeneration in the DPF by a heat source, and therefore, the exhaust gas purification apparatus can have excellent energy efficiency and economic feasibility during operation thereof, and excellent efficiency in processing a pollutant contained in diesel exhaust gas, reduce the amount of a catalyst used in a diesel gas purifier, and can be manufactured to be compact and smaller.

DESCRIPTION OF DRAWINGS

FIG. 1 illustrates a conventional exhaust gas purification apparatus.

FIG. 2 illustrates an exhaust gas purification apparatus according to an exemplary embodiment of the present invention.

FIG. 3 a flow chart illustrating a method for purifying exhaust gas using the exhaust gas purification apparatus according to an exemplary embodiment of the present invention through the steps of through the steps of S10, S20, S30, S40, S50, S60, and S70.

BEST MODE

In the description of the present invention, when a detailed description on the related known technology or configurations is determined to unnecessarily obscure the subject matter of the present invention, the detailed description will be omitted.

Moreover, the terms to be described below are defined in consideration of functions in an embodiment of the present invention, and may vary according to a user, the intention or custom of an operator. Therefore, the definitions should be based on the contents spanning the entire specification.

Exhaust Gas Purification Apparatus

One aspect of the present invention relates to an exhaust gas purification apparatus. FIG. 2 illustrates an exhaust gas purification apparatus according to an exemplary embodiment of the present invention. Referring to FIG. 2, an exhaust gas purification apparatus 200 includes a DOC unit 110 configured to convert NOx contained in the exhaust gas input through a gas inlet 10 into $NO_2$; a composite DPF unit 120 which is connected to a rear end of the DOC unit 110 via an input line 20, and configured to remove harmful components including PM and NOx due to the input of the exhaust gas discharged from the DOC unit 110; and a circulation line 130 which is provided at the input line 20 and configured to input the exhaust gas discharged from the DOC unit 110 to the gas inlet 10.

DOC Unit

The DOC unit 110 is configured to convert (or oxidize) nitrogen monoxide (NO) among NOx in the exhaust gas into $NO_2$. In one exemplary embodiment, in the DOC unit 110, about 3 g/ft to about 7 g/ft of platinum may be supported on a porous alumina support 111. For example, the DOC unit 110 may be formed in a honeycomb shape in which about 4 $g/ft^3$ to about 6 $g/ft^3$ of platinum is supported on the porous alumina ($Al_2O_3$) support 111 having a thickness of about 2 nm to about 4 nm. According to the amount of the supported catalyst, about 10% of NO among NOx generally contained in the diesel engine exhaust gas may be converted into $NO_2$. In the present invention, the DOC unit 110 may minimize an amount of the supported catalyst and enhance a $NO_2$ conversion rate, thereby exhibiting an excellent effect of reducing costs.

Composite DPF Unit

The composite DPF unit 120 is connected to a rear end of the DOC unit 110 via the input line 20, and configured to remove harmful components including PM and NOx due to the input of the exhaust gas discharged from the DOC unit 110. In one exemplary embodiment, in the composite DPF unit, the gas purified by removing the harmful component in the composite DPF unit may be discharged outside through an outlet 30.

In one exemplary embodiment, the composite DPF unit 120 may include one or more supports 121 among silicon carbide (SiC), cordierite ($2MgO.2Al_2O_3.5SiO_2$), aluminum titanate ($Al_2TiO_5$) and needle-like mullite ($Al_2SiO_5$). When such a type of support is included, the composite DPF unit 120 may have an excellent effect of removing NOx and PM.

For example, the composite DPF unit 120 may include one or more selected from silicon carbide (SiC), cordierite ($2MgO \cdot 2Al_2O_3 \cdot 5SiO_2$), aluminum titanate ($Al_2TiO_5$) and needle-like mullite ($Al_2SiO_5$) as a support 121 and have a honeycomb shape with a pore size of about 10 μm to about 30 μm. The "size" used herein is defined as "maximum length."

Referring to FIG. 2, a reducing agent inlet 24 may be further included upstream of the composite DPF unit such that a reducing agent is input therethrough. In one exemplary embodiment, the reducing agent is input to the composite DPF unit 120 through the reducing agent inlet 24 to have a reaction with NOx in the exhaust gas such that the NOx is converted into nitrogen and moisture and removed. The reducing agent may include urea.

In one exemplary embodiment, the composite DPF unit 120 may further include an SCR layer 122.

In the SCR layer 122, an active ingredient and a promoter may be supported on a support containing a titanium dioxide-zirconia compound, the active ingredient may include a rare earth element-vanadate compound, and the promoter may include a transition metal oxide.

When the titanium dioxide-zirconia compound is applied as the support, a binary oxide (Ti—O—Zr) structure is formed such that a surface acid point is increased, and transformation of titanium dioxide from an anatase structure to a rutile structure is prevented at a high temperature, and therefore excellent catalytic activity may be obtained even at a high temperature.

In one exemplary embodiment, the support may contain the titanium dioxide ($TiO_2$) and zirconia ($ZrO_2$) at a molar ratio of about 1:0.8 to about 1:1.5. In this molar ratio range, excellent physical strength and thermal stability of the SCR layer 122, and excellent efficiency in removing the harmful components including NOx and PM may be achieved. For example, a molar ratio of the titanium dioxide and the zirconia may be about 1:1.

In one exemplary embodiment, the support may be included at about 80 wt % to about 90 wt % based on the total weight of the SCR layer 122. When the support is included in the above weight range, it easily supports the active ingredient, and has an increased specific surface area, excellent reactivity and a high NOx conversion rate at a high temperature. For example, the support may be included at about 80, 81, 82, 83, 84, 85, 86, 87, 88, 89 or 90 wt %.

The active ingredient may increase catalyst activity and enhance the NOx-to-$NO_2$ conversion rate at a high temperature. In one exemplary embodiment, the active ingredient may include vanadate or a rare earth element-vanadate compound.

In one exemplary embodiment, the rare earth element-vanadate compound may include one or more rare earth elements including scandium, yttrium, and lanthanides including lanthanum (La) to lutetium (Lu). For example, as the rare earth element-vanadate compound, one or more compounds selected from terbium-vanadate ($TbVO_4$), erbium-vanadate ($ErVO_4$), cerium-vanadate ($CeVO_4$), lanthanum-vanadate ($LaVO_4$), gadolinium-vanadate ($GdVO_4$), praseodymium-vanadate ($PrVO_4$), neodymium-vanadate ($NdVO_4$), promethium-vanadate ($PmVO_4$), samarium-vanadate ($SmVO_4$), europium-vanadate ($EuVO_4$), dysprosium-vanadate ($DyVO_4$), holmium-vanadate ($HoVO_4$), thulium-vanadate ($TmVO_4$), ytterbium-vanadate ($YbVO_4$) and lutetium-vanadate ($LuVO_4$) may be included. When the rare earth element-vanadate compound is applied, excellent efficiency in enhancing catalytic activity is achieved, and thus the NOx-to-$NO_2$ conversion rate may be enhanced at a high temperature. In one exemplary embodiment, as the rare earth element-vanadate compound, one or more compounds selected from cerium-vanadate ($CeVO_4$) and terbium-vanadate ($TbVO_4$) may be included.

In one exemplary embodiment, the active ingredient may be contained at about 1 wt % to about 13 wt % based on the total weight of the SCR layer 122. When the active ingredient is contained in the above range, excellent SCR efficiency may be achieved. For example, the active ingredient may be contained at about 1, 2, 3, 4, 5, 6, 7, 8, 9, 10, 11, 12 or 13 wt %.

In one exemplary embodiment, the rare earth element-vanadate compound may contain vanadate and a rare earth element at a weight ratio of about 1:1 to about 1:5. In this range, excellent efficiency in removing NOx in exhaust gas may be achieved.

The promoter may be contained to improve physical strength, such as durability of an active material, and SCR efficiency. In one exemplary embodiment, the promoter may include a transition metal oxide. In one exemplary embodiment, as the transition metal oxide, one or more of molybdenum oxide ($MoO_3$) and tungsten oxide ($WO_3$) may be included.

In one exemplary embodiment, the promoter may be contained at about 1 wt % to about 15 wt % based on the total weight of the SCR layer 122. When the promoter is contained in this range, excellent SCR efficiency may be achieved. For example, the promoter may be contained at about 1, 2, 3, 4, 5, 6, 7, 8, 9, 10, 11, 12, 13, 14 or 15 wt %.

In one exemplary embodiment, the exhaust gas input to the composite DPF unit 120 may have a $NO_2$ conversion rate of about 0.2 or more, defined by Equation 1 below:

$$NO_2 \text{ conversion rate} = NO_2 \text{ mass}/NOx \text{ mass in exhaust gas} \quad \text{[Equation 1]}$$

When the conversion rate is about 0.2 or more, the composite DPF unit 120 may have excellent efficiency in removing harmful components including PM and NOx. For example, the conversion rate of the exhaust gas input to the composite DPF unit 120 may be about 0.5 or more. In another example, the conversion rate may be about 0.5 to about 1. In still another example, the conversion rate may be about 0.5 to 0.9. For example, the conversion rate may be about 0.2, 0.25, 0.3, 0.35, 0.4, 0.45, 0.5, 0.55, 0.6, 0.65, 0.7, 0.75, 0.8, 0.85 or 0.9.

Circulation Line

In one exemplary embodiment, at the input line 20 according to an exemplary embodiment of the present invention, a circulation line 130 configured to input the exhaust gas discharged from the DOC unit 110 through the gas inlet is provided. Referring to FIG. 2, a rear of the DOC unit 110, a concentration measuring unit 22 configured to measure the concentration of NOx such as NO and $NO_2$ in the exhaust gas may be further included.

For example, using the NOx concentration measured at the concentration measuring unit 22, the $NO_2$ conversion rate may be deduced according to Equation 1.

Referring to FIG. 2, the exhaust gas purification apparatus 200 may further include a control unit 140 electrically connected with a circulation valve 132, the concentration measuring unit 22, the reducing agent inlet 24 and a back-pressure valve (not shown) and controlling them. For example, information on a NOx concentration in the exhaust gas measured at the concentration measuring unit 22 is transmitted to the control unit 140, such that the circulation valve 132 may be controlled by the control unit 140 and a flow rate may be controlled. According to the conversion rate ($NO_2/NOx$) according to Equation 1, the exhaust gas discharged from the DOC unit may be input to the gas inlet by controlling the circulation valve 132 provided at the circulation line 130.

In one exemplary embodiment, at the input line 20, the concentration measuring unit 22 configured to measure the concentration of NOx in the exhaust gas is further provided, information on the NOx concentration measured at the concentration measuring unit 22 is transmitted to the control unit 140 electrically connected with the concentration measuring unit 22. When the exhaust gas $NO_2$ conversion rate deduced in the control unit 140 using the measured NOx concentration is about less than 0.2, the control unit 140 may be provided at the input line 20, and configured to control the circulation valve 132 electrically connected with the control unit 140 such that the exhaust gas is input to the gas inlet 10. For example, when the conversion rate is about less than 0.5, the exhaust gas may be input to the gas inlet 10. When the exhaust gas is input through the gas inlet as described above, the $NO_2$ content in the exhaust gas discharged from the DOC unit may be increased, and passive regeneration in the composite DPF unit may be easily realized.

Due to integration of a DPF unit and an SCR unit and exclusion of a heat source such as a heater essentially included in a conventional DPF unit, the exhaust gas purification apparatus of the present invention may enable oxidative removal (or regeneration) using a high concentration of nitrogen dioxide in exhaust gas without regeneration in a composite DPF caused by a heat source. Therefore, the exhaust gas purification apparatus can have excellent energy efficiency and economic feasibility during operation thereof, and excellent efficiency in processing a pollutant contained in diesel exhaust gas, reduce the amount of a catalyst used in a diesel gas purifier, and can be manufactured to be compact and smaller.

Method for Purifying Exhaust as Using Exhaust as Purification Apparatus

Referring to FIG. 3, Another aspect of the present invention relates to a method for purifying exhaust gas using the exhaust gas purification apparatus. In one exemplary embodiment, the method for purifying exhaust gas includes: converting NOx in exhaust gas into $NO_2$ by inputting exhaust gas to a DOC unit through a gas inlet S10; and removing harmful components including PM and NOx in the exhaust gas by inputting the exhaust gas to a composite DPF unit via an input line S20, wherein the exhaust gas discharged from the DOC unit is input to the gas inlet through a circulation line provided at the input line S30.

In one exemplary embodiment, the composite DPF unit may not include a heat source and can be configured to remove harmful components by the input exhaust gas.

In one exemplary embodiment, the exhaust gas input to the composite DPF unit may have a $NO_2$ conversion rate of about 0.2 or more, defined by Equation 1 below:

$NO_2$ conversion rate=$NO_2$ mass/NOx mass in exhaust gas S70 [Equation 1]

When the conversion rate is 0.2 or more, excellent efficiency in removing harmful components including PM and NOx in the composite DPF unit may be obtained. For example, the conversion rate of the exhaust gas input to the composite DPF unit may be about 0.5 or more. In another example, the conversion rate may be about 0.5 to about 1. In still another example, the conversion rate may be about 0.5 to 0.9. For example, the conversion rate may be about 0.2, 0.25, 0.3, 0.35, 0.4, 0.45, 0.5, 0.55, 0.6, 0.65, 0.7, 0.75, 0.8, 0.85 or 0.9.

In one exemplary embodiment, at the input line, a concentration measuring unit configured to measure the concentration of NOx in the exhaust gas may be further provided S40, information on the NOx concentration measured at the concentration measuring unit may be transmitted to the control unit electrically connected with the concentration measuring unit S50, and when the exhaust gas $NO_2$ conversion rate deduced using the measured NOx concentration is about less than 0.2, the control unit may be provided at the circulation line, and configured to control a circulation valve electrically connected therewith such that the exhaust gas is input to the gas inlet S60.

MODE FOR INVENTION

Hereinafter, configurations and actions of the present invention will be described in further detail with reference to exemplary examples of the present invention. However, these examples are merely provided as preferable examples, and it is to be understood that the present invention is not limited to the following examples in any way.

Hereinafter, configurations and actions of the present invention will be described in further detail with reference to exemplary examples of the present invention. However, these examples are merely provided as preferable examples, and it is to be understood that the present invention is not limited to the following examples in any way.

Preparation Example 1

A honeycomb-shaped support was manufactured by applying titanium dioxide ($TiO_2$) as a support of an SCR layer 122.

Preparation Example 2

A support was manufactured by the same method as described in Preparation Example 1, except that titanium dioxide ($TiO_2$) and zirconia ($ZrO_2$) were applied at a molar ratio of 1:0.1.

Preparation Example 3

A support was manufactured by the same method as described in Preparation Example 1, except that titanium dioxide ($TiO_2$) and zirconia ($ZrO_2$) were applied at a molar ratio of 1:0.5.

Preparation Example 4

A support was manufactured by the same method as described in Preparation Example 1, except that titanium dioxide ($TiO_2$) and zirconia ($ZrO_2$) were applied at a molar ratio of 1:1.

Preparation Example 5

A support was manufactured by the same method as described in Preparation Example 1, except that only zirconia ($ZrO_2$) was applied.

Specific surface areas ($m^2/g$) of the supports manufactured according to Preparation Examples 1 to 5, which were measured by a BET method, are shown in Table 1.

TABLE 1

| Classification | Specific surface area (m²/g @400° C.) |
|---|---|
| Preparation Example 1 | 83 |
| Preparation Example 2 | 152 |
| Preparation Example 3 | 182 |
| Preparation Example 4 | 234 |
| Preparation Example 5 | 196 |

Referring to Table 1, it can be seen that the support containing titanium dioxide ($TiO_2$) and zirconia ($ZrO_2$) in a molar ratio of 1:1 has the highest specific surface area.

Examples and Comparative Examples

SCR preparation: Components used in the preparation of SCR 122 included in the composite DPF unit of the present invention are as follows.

(a) Support: The support manufactured by Preparation Example 4 was used.

(b) Active material: (b1) Cerium-vanadate ($CeVO_4$; containing cerium:vanadate=2.5:1 weight ratio) was used. (b2) Terbium-vanadate ($TbVO_4$; containing terbium:vanadate=2.5:1 weight ratio) was used.

(c) Promoter: (c1) Tungsten oxide ($WO_3$) was used. (c2) Molybdenum oxide ($MoO_3$) was used.

Example 1

SCR 122 was prepared by stepwise supporting the active material and the promoter on the content of the support shown in Table 1 below by impregnation, drying the resulting support at 100° C., and plasticizing the support at 500° C. for 2 to 3 hours.

Examples 2 to 12

SCR 122 was prepared by the same method as described in Example 1, except that a support, an active material and a promoter were applied according to the components and contents shown in Table 2.

Comparative Examples 1 to 5

SCR 122 was prepared by the same method as described in Example 1, except that support, an active material and a promoter were applied according to the components and contents shown in Table 2.

TABLE 2

| Classification | | (b) | | (c) | |
|---|---|---|---|---|---|
| (units: wt %) | (a) | (b1) | (b2) | (c1) | (c2) |
| Example 1 | 90 | 3 | — | 7 | — |
| Example 2 | 85 | 5 | — | 10 | — |
| Example 3 | 80 | 7 | — | 13 | — |
| Example 4 | 90 | 3 | — | — | 7 |
| Example 5 | 85 | 5 | — | — | 10 |
| Example 6 | 80 | 7 | — | — | 13 |
| Example 7 | 90 | — | 3 | 7 | — |
| Example 8 | 85 | — | 5 | 10 | — |
| Example 9 | 80 | — | 7 | 13 | — |
| Example 10 | 90 | — | 3 | — | 7 |
| Example 11 | 85 | — | 5 | — | 10 |
| Example 12 | 80 | — | 7 | — | 13 |
| Comparative Example 1 | 100 | — | — | — | — |
| Comparative Example 2 | 95 | 5 | — | — | — |
| Comparative Example 3 | 95 | — | — | 5 | — |
| Comparative Example 4 | 95 | — | 5 | — | — |
| Comparative Example 5 | 95 | — | — | — | 5 |

Catalytic activity test: 1 g of each of the SCRs 122 prepared according to Examples 1 to 12 and Comparative Examples 1 to 5 was input to a fixed-bed reactor, NOx-to-$NO_2$ conversion rates ($NO_2$ mass/NOx mass in simulated exhaust gas) were compared by temperature using an FT-IR device under a condition of a space velocity of 50,000/hr with simulated exhaust gas (1,000 ppm of NOx, 500 ppm of sulfur oxide, 5% oxygen, 5% moisture, the molar ratio of ammonia/NOx=1.2), and the result is shown in Table 3 below.

In addition, a catalytic activity test was performed on SCR 122 prepared using the support, the active component and the promoter component of each of Examples 1 to 12 by hydrothermal treatment at 620° C. under a condition of 10%/humidity for 24 hours, and the result is shown in Table 3 below.

TABLE 3

| | 300° C. | | 400° C. | | 500° C. | |
|---|---|---|---|---|---|---|
| Classification (units: wt %) | fresh | Aged (620° C.) | fresh | Aged (620° C.) | fresh | Aged (620° C.) |
| Example 1 | 93 | 91 | 94 | 92 | 89 | 88 |
| Example 2 | 95 | 97 | 99 | 98 | 97 | 92 |
| Example 3 | 91 | 92 | 89 | 86 | 87 | 85 |
| Example 4 | 89 | 88 | 91 | 89 | 87 | 85 |
| Example 5 | 90 | 88 | 91 | 87 | 84 | 84 |
| Example 6 | 87 | 90 | 89 | 90 | 81 | 79 |
| Example 7 | 84 | 83 | 85 | 84 | 82 | 80 |
| Example 8 | 90 | 89 | 92 | 90 | 85 | 81 |
| Example 9 | 85 | 83 | 88 | 89 | 83 | 81 |
| Example 10 | 83 | 85 | 85 | 86 | 81 | 79 |
| Example 11 | 82 | 84 | 87 | 85 | 79 | 76 |
| Example 12 | 81 | 80 | 82 | 81 | 77 | 76 |
| Comparative Example 1 | 48 | — | 30 | — | 18 | — |
| Comparative Example 2 | 63 | — | 61 | — | 42 | — |
| Comparative Example 3 | 56 | — | 53 | — | 34 | — |
| Comparative Example 4 | 58 | — | 54 | — | 35 | — |
| Comparative Example 5 | 54 | — | 51 | — | 29 | — |

Referring to Table 3, compared to Comparative Examples 1 to 5 to which the active component and the promoter among the SCR 122 components of the present invention were not applied, in Examples 1 to 12 according to the present invention, it can be seen that catalytic activity was not decreased at a high temperature of 500° C., and a $NO_2$ conversion rate was excellent. It can also be seen that, even when a SCR 122 catalyst was prepared by hydrothermal treatment at 620° C. under a condition of 10%/humidity for 24 hours, it still has excellent catalytic activity.

Example 13

Rear of a 500-kW diesel engine 1, an exhaust gas purification apparatus 200 was installed as shown in FIG. 2. Exhaust gas having 1,080 to 1,400 ppm of NOx, 9.0 to 24.5 mg/Nm$^3$ of PM and a molar ratio of ammonia/NOx=0.7 to 0.9 was used. A DOC unit 110 was prepared by supporting 5 g/ft$^3$ of platinum (Pt) on a honeycomb-shaped porous alumina support 111 having a thickness of 2 to 4 mm, and a composite DPF unit 120 was prepared by forming an SCR layer 122 having the composition of Preparation Example 4 on a honeycomb-shaped support (aluminum titanate) 121 having a pore size of 10 μm to 30 μm.

Exhaust gas (1,080 to 1,400 ppm of NOx, 9.0 to 24.5 mg/Nm$^3$ of PM, the molar ratio of ammonia/NOx=0.7 to 0.9) g1 was input to the DOC unit 110 through a gas inlet 10 and NOx in the exhaust gas g2 was converted into NO$_2$ to discharge the exhaust gas through an input line 20.

Here, information on the concentration of NOx in the exhaust gas, which was measured at a concentration measuring unit 22 included a rear of the DOC unit 110 was transmitted to a control unit 140 electrically connected with the concentration measuring unit 22. Since the conversion rate of NO$_2$ in the exhaust gas deduced in the control unit (NO$_2$ mass/NOx mass in exhaust gas) was measured at 0.09, the exhaust gas discharged from the DOC unit 110 was input to the gas inlet 10 by controlling a circulation valve 132 electrically connected with the control unit 140, and then treated by inputting the exhaust gas to the DOC unit 110.

Afterward, a NO$_2$ conversion rate deduced in the control unit 140 by measuring the exhaust gas discharged from the DOC unit 110 at the concentration measuring unit 22 was 0.2. The exhaust gas was input to the composite DPF unit 120 through the input line 20, and a reducing agent (urea) was input to the composite DPF unit 120 through a reducing agent inlet 24 to remove harmful components including PM and NOx in the exhaust gas, and discharge the purified exhaust gas g2 through an outlet 30.

Examples 14 to 21

Exhaust gas g1 was purified by the same method as described in Example 13, except that a NO$_2$ conversion rate was adjusted as shown in Table 4 by controlling a circulation valve 132 provided at a circulation line 130.

Comparative Example 6

Exhaust gas g1 was purified by the same method as described in Example 13, except that the exhaust gas was sequentially input to a DOC unit and a composite DPF unit using an exhaust gas purification apparatus without a circulation line 130.

A result obtained by measuring a PM removal rate (%) and a NOx removal rate (%) of the exhaust gas g2 purified using each of the exhaust gas purification apparatus of Examples 13 to 21 and Comparative Example 6 is shown in Table 4 below.

TABLE 4

| Classification | Conversion rate (NO$_2$/NOx) | PM removal rate (%) | NOx removal rate (%) |
| --- | --- | --- | --- |
| Example 13 | 0.2 | 51 | 83 |
| Example 14 | 0.3 | 63 | 85 |
| Example 15 | 0.4 | 76 | 89 |
| Example 16 | 0.5 | 100 | 98 |
| Example 17 | 0.6 | 100 | 93 |
| Example 18 | 0.7 | 100 | 91 |
| Example 19 | 0.8 | 100 | 90 |
| Example 20 | 0.9 | 100 | 89 |
| Example 21 | 1.0 | 100 | 87 |
| Comparative Example 6 | 0.1 | 42 | 81 |

Referring to Table 4, it can be seen that, compared to Comparative Example 6 in which no circulation line was applied, Examples 13 to 21 in which the NO$_2$ conversion rate was enhanced by applying the circulation line according to the present invention exhibited excellent efficiency in removing harmful components including PM and NOx.

It will be understood by those skilled in the art that simple changes or modifications may be easily made, and are considered to be included in the scope of the present invention.

The invention claimed is:

1. An exhaust gas purification apparatus, comprising:
a diesel oxidation catalyst (DOC) unit which is configured to convert nitrogen oxides (NOx) contained in an exhaust gas discharged from an engine and inputted through a gas inlet of the DOC unit into NO$_2$;
a composite diesel particulate filter (DPF) unit which is connected to a rear end of the DOC unit via an input line, and configured to remove harmful components including particulate matter (PM) and NOx from the exhaust gas discharged from the engine and inputted from the DOC unit through an outlet and configured to discharge the harmful components through an outlet;
a concentration measurer configured to measure a NOx concentration of the exhaust gas in the input line;
a circulation line configured to recirculate the exhaust gas discharged from the DOC unit to the DOC unit gas inlet when the exhaust gas NO$_2$ conversion rate is less than 0.2 based upon the measured NOx concentration by the concentration measurer;
a circulation valve electrically connected between the DOC unit and the circulation line; and
a control unit;
wherein the circulation valve, provided on the circulation line, is controlled to input to the gas inlet via at least one of the circulation line and the input line, by the control unit for recirculating the exhaust gas to the DOC via the gas inlet,
wherein the NOx concentration measured at the concentration measurer is transmitted to the control unit electrically connected with the concentration measurer, and
wherein the exhaust gas inputted to the composite DPF unit if the NO$_2$ conversion rate is 0.2 or more, defined as NO$_2$ conversion rate=NO$_2$ mass/NOx mass in exhaust gas.

2. The exhaust gas purification apparatus according to claim 1, wherein the composite DPF unit comprises one or more supports among silicon carbide (SiC), cordierite (2MgO.2Al2O3.5SiO2), aluminum titanate (Al2TiO5) and needle-like mullite (Al2SiO5).

3. The exhaust gas purification apparatus according to claim 1, wherein the composite DPF unit further comprises a selective catalytic reduction (SCR) layer.

4. The exhaust gas purification apparatus according to claim 3, wherein the SCR layer is prepared by supporting an active ingredient and a promoter on a support containing a titanium dioxide-zirconia compound, and the active ingredient includes a rare earth element-vanadate compound, and the promoter includes a transition metal oxide.

5. The exhaust gas purification apparatus according to claim 4, wherein the support contains the titanium dioxide and zirconia at a molar ratio of 1:0.8 to 1:1.5.

6. The exhaust gas purification apparatus according to claim 4, wherein the SCR layer comprises 80 wt % to 90 wt % of the support, 1 wt % to 13 wt % of the active ingredient and 1 wt % to 15 wt % of the promoter with respect to a total weight thereof.

7. The exhaust gas purification apparatus according to claim 1, wherein the composite DPF unit does not include a heat source, and is configured to remove a harmful component by NO2 in the input exhaust gas.

8. The exhaust gas purification apparatus according to claim 1, wherein the DOC unit is prepared by supporting 3 g/ft3 to 7 g/ft3 of platinum on a porous alumina support.

9. A method for purifying exhaust gas, comprising:

converting nitrogen oxides (NOx) in exhaust gas into NO2 by inputting exhaust gas discharged from an engine to a diesel oxidation catalyst (DOC) unit through a gas inlet;

removing harmful components including particulate matter (PM) and NOx in the exhaust gas by inputting the exhaust gas discharged from the engine to a composite diesel particulate filter (DPF) unit via an input line;

inputting the exhaust gas discharged from the DOC unit to the gas inlet through a circulation line provided at the input line;

measuring a NOx concentration of the exhaust gas using a concentration measurer which is provided at the input line;

transmitting information on the NOx concentration measured at the concentration measurer to a control unit electrically connected with the concentration measurer;

inputting the exhaust gas to the gas inlet via the circulation line by controlling a circulation valve electrically connected therewith, with the control unit, if $NO_2$ conversion rate is less than 0.2; and inputting the exhaust gas from the DOC unit to the composite DPF unit if $NO_2$ conversion rate is less than 0.2 or more, defined as $NO_2$ conversion rate=$NO_2$ mass/NOx mass in exhaust gas.

* * * * *